(12) United States Patent
Diehl et al.

(10) Patent No.: US 8,306,639 B2
(45) Date of Patent: Nov. 6, 2012

(54) HOME AUTOMATION GROUP SELECTION BY COLOR

(75) Inventors: William Diehl, Dove Canyon, CA (US); Sonny Windstrup, Copenhagen (DK); Karl Jonsson, Rancho Santa Margarita, CA (US)

(73) Assignee: Greenwave Reality, Pte, Ltd., Singapore (SG)

( * ) Notice: Subject to any disclaimer, the term of this patent is extended or adjusted under 35 U.S.C. 154(b) by 407 days.

(21) Appl. No.: 12/795,381

(22) Filed: Jun. 7, 2010

(65) Prior Publication Data
US 2011/0098831 A1 Apr. 28, 2011

Related U.S. Application Data

(60) Provisional application No. 61/254,709, filed on Oct. 25, 2009.

(51) Int. Cl.
*G06F 19/00* (2011.01)
(52) U.S. Cl. .............................. 700/90; 307/38; 315/307
(58) Field of Classification Search .................. 715/38, 715/734, 751; 341/176, 23, 34; 345/173, 345/156; 700/90; 315/307; 307/8
See application file for complete search history.

(56) References Cited

U.S. PATENT DOCUMENTS

| | | | |
|---|---|---|---|
| 4,858,141 A | 8/1989 | Hart et al. |
| 4,918,690 A | 4/1990 | Markkula et al. |
| 5,258,656 A | 11/1993 | Pawlick |
| 5,301,122 A | 4/1994 | Halpern |
| 5,483,153 A | 1/1996 | Leeb et al. |

(Continued)

FOREIGN PATENT DOCUMENTS
JP 2001-307505 A 11/2001
(Continued)

OTHER PUBLICATIONS

Hart, G. W, Nonintrusive appliance load monitoring, Porceedings of the IEEE, vol. 80, No. 12, Dec. 1, 1992, pp. 1870-1891, IEEE, New York, NY, US.

(Continued)

*Primary Examiner* — Kidest Bahta
(74) *Attorney, Agent, or Firm* — Bruce A. Young

(57) ABSTRACT

A networked device is disclosed comprising means for controlling a state of the networked device, means for connecting to a network, means for allowing a user to select a color from a plurality of colors, the plurality of colors having at least one locking color and one or more non-locking colors, and means for generating a selected color code corresponding to the color selected by the user, each color of the plurality of colors having a corresponding color code. The networked device submits the selected color code over the network for use by the network controller in configuring the device and changes the state of the networked device in response to a command from the network only if the color selected by the user is one of the one or more non-locking colors. In some embodiments the networked device also responds to requests for status information from the network independent of the color selected by the user. In some embodiments, the networked device further comprises means for allowing the user enter a local control command wherein the means for controlling the networked device changes the state of the networked device in response to the local control command only if the color selected by the user is one of the one or more non-locking colors. And in some embodiments that means for controlling the networked device controls the On/Off state.

21 Claims, 9 Drawing Sheets

| Num | Sym | Color | Print Colors | | | | Computer Colors | | | Fill |
|---|---|---|---|---|---|---|---|---|---|---|
| | | | C% | M% | Y% | K% | R | G | B | |
| 0 | | Black | 50 | 50 | 50 | 100 | 0 | 0 | 0 | |
| 1 | 1 | Green | 80 | 0 | 100 | 0 | 0 | 189 | 31 | |
| 2 | 2 | Blue | 100 | 50 | 0 | 0 | 0 | 79 | 217 | |
| 3 | 3 | Red | 0 | 100 | 100 | 0 | 227 | 0 | 0 | |
| 4 | 4 | Yellow | 0 | 0 | 100 | 0 | 255 | 229 | 0 | |
| 5 | 5 | Violet | 50 | 60 | 0 | 0 | 132 | 95 | 207 | |
| 6 | 6 | Orange | 0 | 50 | 100 | 0 | 250 | 138 | 0 | |
| 7 | 7 | Aqua | 60 | 0 | 10 | 0 | 75 | 195 | 222 | |
| 8 | 8 | Pink | 0 | 55 | 0 | 0 | 255 | 89 | 183 | |
| 9 | 🔒 | White | 0 | 0 | 0 | 0 | 255 | 255 | 255 | |

U.S. PATENT DOCUMENTS

| | | | |
|---|---|---|---|
| 5,519,878 A | 5/1996 | Dolin, Jr. | |
| 5,650,771 A | 7/1997 | Lee | |
| 5,717,325 A | 2/1998 | Leeb et al. | |
| 5,754,963 A | 5/1998 | Nunneley et al. | |
| 6,038,523 A | 3/2000 | Akahane et al. | |
| 6,160,551 A | 12/2000 | Naughton et al. | |
| 6,476,729 B1 | 11/2002 | Liu | |
| 6,492,897 B1 | 12/2002 | Mowery | |
| 6,501,463 B1* | 12/2002 | Dahley et al. | 345/173 |
| 6,987,444 B2 | 1/2006 | Bub et al. | |
| 6,993,417 B2 | 1/2006 | Osann, Jr. | |
| 7,355,523 B2* | 4/2008 | Sid | 340/9.16 |
| 7,579,711 B2 | 8/2009 | Menas et al. | |
| 7,772,718 B2 | 8/2010 | Lee et al. | |
| 7,844,353 B2* | 11/2010 | Bejean et al. | 700/83 |
| 7,876,255 B2* | 1/2011 | Conway et al. | 341/176 |
| 7,885,917 B2 | 2/2011 | Kuhns et al. | |
| 7,956,546 B2 | 6/2011 | Hasnain | |
| 7,961,111 B2 | 6/2011 | Tinaphong et al. | |
| 7,970,542 B2 | 6/2011 | Bent et al. | |
| 8,013,545 B2 | 9/2011 | Jonsson | |
| 8,049,655 B2* | 11/2011 | Conway et al. | 341/176 |
| 2002/0152045 A1* | 10/2002 | Dowling et al. | 702/107 |
| 2003/0025840 A1* | 2/2003 | Arling | 348/734 |
| 2003/0050737 A1 | 3/2003 | Osann | |
| 2003/0197772 A1* | 10/2003 | Iwatsuki et al. | 347/104 |
| 2006/0202557 A1 | 9/2006 | Menas et al. | |
| 2006/0271544 A1 | 11/2006 | Devarakonda et al. | |
| 2007/0135973 A1 | 6/2007 | Petite | |
| 2007/0297112 A1 | 12/2007 | Gilbert | |
| 2008/0094210 A1 | 4/2008 | Paradiso et al. | |
| 2008/0201268 A1* | 8/2008 | Duncan | 705/80 |
| 2008/0270937 A1* | 10/2008 | Poulet et al. | 715/810 |
| 2009/0059603 A1 | 3/2009 | Recker et al. | |
| 2009/0202250 A1* | 8/2009 | Dizechi et al. | 398/107 |
| 2009/0234512 A1 | 9/2009 | Ewing et al. | |
| 2009/0236909 A1 | 9/2009 | Aldag et al. | |
| 2009/0237006 A1 | 9/2009 | Champion et al. | |
| 2009/0267540 A1 | 10/2009 | Chemel et al. | |
| 2009/0322159 A1 | 12/2009 | DuBose et al. | |
| 2010/0005331 A1 | 1/2010 | Somasundaram et al. | |
| 2010/0084992 A1 | 4/2010 | Valois et al. | |
| 2010/0090542 A1 | 4/2010 | Johnson et al. | |
| 2010/0141153 A1 | 6/2010 | Recker et al. | |
| 2010/0145542 A1 | 6/2010 | Chapel et al. | |
| 2010/0191487 A1 | 7/2010 | Rada et al. | |
| 2011/0031819 A1 | 2/2011 | Gunwall | |
| 2011/0062874 A1 | 3/2011 | Knapp | |
| 2011/0098867 A1 | 4/2011 | Jonsson et al. | |
| 2011/0309735 A1 | 12/2011 | Parker et al. | |
| 2012/0126699 A1 | 5/2012 | Zittel et al. | |

FOREIGN PATENT DOCUMENTS

| | | |
|---|---|---|
| JP | 2006-525640 A | 11/2006 |
| JP | 2008-123727 A | 5/2008 |
| KR | 10-2002-0034855 A | 5/2002 |
| WO | 03-026358 A1 | 3/2003 |
| WO | 2003026358 A1 | 3/2003 |
| WO | 2003077100 A1 | 9/2003 |
| WO | 2005039144 A1 | 4/2005 |
| WO | 2009084016 A2 | 7/2009 |
| WO | 2009097400 A1 | 8/2009 |
| WO | 2011050224 A1 | 4/2011 |

OTHER PUBLICATIONS

Jiang et al., Design and Implementation of a High-Fidelity AC Metering Network IPSN '09, San Francisco, Apr. 13-16, 2009, San Francisco, CA, USA ACM 978-1-60558-371-6/09/04.

Non-Final Office Action for U.S. Appl. No. 13/195,655, USPTO, Jun. 21, 2011.

K. Jonsson, "Modular Networked Light Bulb," GWRPID-002A, Unpublished U.S. Appl. No. 12/795,395, filed Jun. 7, 2010.

"Lamp Module Receiver PLM03 User Manual," X10, Inc. 2008, http://www.x10pro.com/pro/pdf/plm03.pdf retrieved on May 25, 2010.

W. Diehl, "Networked Light Bulb with Color Wheel for Configuration," GWRPID-002B, Unpublished U.S. Appl. No. 12/795,406, filed Jun. 7, 2010.

K. Jonsson, "Networked Device with Power Usage Estimation," GWRPID-002C, Unpublished U.S. Appl. No. 12/795,417, filed Jun. 7, 2010.

K. Jonsson, "Power Node for Energy Management," GWRPID-006, Unpublished U.S. Appl. No. 12/777,229, filed May 10, 2010.

K. Jonsson, "Automated Load Assessment Device and Method," GWRPID-001A, Unpublished U.S. Appl. No. 12/795,629, filed Jun. 7, 2010.

A. Pudenzi, A Neuron Nets Based Procedure for Identifying Domestic Appliances Pattern of Use from Energy Recordings at Meter Panel, IEEE, 2002.

Non-Final Office Action for U.S. Appl. No. 12/795,629, USPTO, Oct. 24, 2011.

Notice of Allowance for U.S. Appl. No. 12/795,395, USPTO, Jul. 22, 2011.

Notice of Allowance for U.S. Appl. No. 12/777,229, USPTO, Nov. 26, 2011.

Notice of Allowance for U.S. Appl. No. 12/795,629, USPTO, Mar. 29, 2012.

Notice of Allowance for U.S. Appl. No. 12/795,629, USPTO, Apr. 18, 2012.

International Search Report and Written Opinion for PCT/US2010/53641, European Patent Office, Mar. 4, 2011.

* cited by examiner

HOME AUTOMATION GROUP SELECTION BY COLOR

CROSS-REFERENCE TO RELATED APPLICATIONS

This application claims the benefit of U.S. Provisional Patent Application Ser. No. 61/254,709 entitled "HYBRID LIGHT" and filed on Oct. 25, 2009, then entire contents of which is hereby incorporated by reference.

BACKGROUND

1. Technical Field

The present subject matter relates to home automation networking. It further relates to initialization and setup of networked home automation devices.

2. Description of Related Art

Providing home automation functionality using networking means is well known in the art. Control of lighting and appliances can be accomplished using systems from many different companies such as X10, Insteon® and Echelon. These systems all require some kind of initialization and setup of the devices to communicate properly on the network. In some cases some of the initialization and setup is pre-defined in the device with no mechanism for the user to easily configure the device for their particular installation. But in many cases, a way for the user to configure the device at the time of installation is required.

US Pat. App. No. 2009/0237006 filed Mar. 18, 2008 by inventors Champion et al. shows a method and apparatus for identifying a group of devices where a controller receives a color identifying value over a communication channel from a management network and then combines the light emitted by the at least two LEDs into an identifying color that identifies a group of devices. In U.S. Pat. No. 4,918,690 issues on Apr. 17, 1990, the inventors Markkula et al. describe a network for sensing, communicating and controlling where each cell in the network is assigned a group identification number.

Inventor Dolin describes an apparatus and method for network node identification and network configuration in U.S. Pat. No. 5,519,878 issued on May 21, 1996. In Dolin's system, each device in the home automation network contains a unique ID that is obtained at the time of installation and then placed on a machine readable medium such as a bar code sticker. The bar code stickers for each device are then placed on paper floor plan to show the physical location of that device. The paper floor plan with the stickers is then read by an automatic configuration device to determine the physical location of each device for future use.

However, neither Champion et al., Markkula et al. nor Dolin address the ability of a user to set the network group or other parameters using a control mechanism on the device itself.

In US Pat. App. No. 2009/0267540, inventors Chemel at al. show an intelligent LED lighting system with mesh networking connectivity. Chemel et al. describe a power management module (PMM) with light module identification. Each light module may have identifying information programmed into it, and can communicate that information to the PMM, which can in turn store and communicate that information to a user or installer to aid in replacement or commissioning. The information may be stored in a nonvolatile memory onboard the light module, and communicated via a digital bus to the PMM. The information may be stored passively on the light module, such as via a series of jumpers or dip switches, and can be read by the PMM. The passive storage may include electrical contacts with encoded bit pattern stored in an optics holder. The passive storage may include passive RFID.

X10 markets a series of home automation control modules such as the PLM03 Lamp Module Receiver. Many X10 modules include two rotary control dials that the user can set at installation to allow each separate module to be independently controlled. One dial is for the "House Code" and can be set to a letter ranging from "A" to "P" while the other dial is for the "Unit Number" which can be set to a number ranging from 1 to 16.

It should be noted that neither the system described by Chemel et al. nor X10 devices address simplifying the way that the user can identify the location or other parameters of a device.

It therefore is important to provide a new method for the user to very easily configure a networked device for the home. The method should be very easy to remember and provide a simple means to configure at least the location or other basic parameter important to the networking of the device.

SUMMARY

Various embodiments of the present subject matter disclose methods and apparatus for configuring a networked device. One disclosed method comprises generating a selected color code corresponding to a color selected from a plurality of colors, each color of the plurality of colors having a corresponding color code and sending the selected color code over a network. In some embodiments, the plurality of colors have at least one locking color and one or more non-locking colors and the networked device changes a state of the networked device in response to a command received over the network only if the color selected is one of the one or more non-locking colors. In at least one embodiment, the command received over the network is an On/Off command and the state of the network device being changed is an On/Off state. In some embodiments the state of the networked device is set to On if the color selected is the at least one locking color. And in some embodiments the networked device responds to a request for status information from the network independent of the color selected. In another embodiment the networked light bulb receives a local control action and changes the state of the networked lighting apparatus in response to the local control action only if the color selected is one of the one or more non-locking colors. In some embodiments the local control command is an On/Off command and the state of the network device being changed by the local control command is an On/Off state.

One embodiment is a networked device comprising means for controlling a state of the networked device, means for connecting to a network, means for allowing a user to select a color from a plurality of colors, the plurality of colors having at least one locking color and one or more non-locking colors, and means for generating a selected color code corresponding to the color selected by the user, each color of the plurality of colors having a corresponding color code. In that embodiment the networked device submits the selected color code over the network but changes the state of the networked device in response to a command from the network only if the color selected by the user is one of the one or more non-locking colors. In some embodiments the networked device also responds to requests for status information from the network independent of the color selected by the user. In some embodiments, the networked device further comprises means for allowing the user enter a local control command wherein the means for controlling the networked device changes the state of the networked device in response to the local control command only if the color selected by the user is one of the one or more non-locking colors. And in some embodiments that means for controlling the networked device controls the On/Off state.

In another embodiment, a networked device is comprised of a controller, a network adapter communicatively coupled to the controller, and a color selection mechanism communicatively coupled to the controller. The color selection mechanism allows a user to select a color from a plurality of colors, the plurality of colors having at least one locking color and one or more non-locking colors. The color selection mechanism communicates information corresponding to the color selected by the user to the controller and the controller converts the information communicated by the color selection mechanism to a color code corresponding to the color selected by the user. The controller communicates the color code to the network adapter and the network adapter sends the color code out over the network. If the network adapter receives a message from the network to change a state of the networked device it is communicated to the controller, but the controller changes the state of the networked device in response to the message to change the state of the networked device communicated by the network adapter only if the color selected by the user is one of the one or more non-locking colors.

In some embodiments, the network adapter connects to a wireless network such as Wi-Fi, Z-wave or Zigbee and in some embodiments the controller and the network adapter are integrated on a single integrated circuit. In other embodiments, the network adapter receives a status request message over the network and communicates it to the controller; and the controller responds to the status request message by communicating a response message to the network adapter to send out over the network, the controller responding independent of the color selected by the user. Yet another embodiment includes a local control interface communicatively coupled to the controller, the local control interface allows the user to enter a local control command to request a change to the state of the networked device and the controller changes the state of the networked device in response to the local control command only if the color selected by the user is one of the one or more non-locking colors.

In some embodiments the color selection mechanism may be a graphical user interface. In some embodiments the color selection mechanism may have a rotary switch with a rotatable shaft and an output communicatively coupled to the controller and a color wheel having a center, an edge and a colored area, the center of the color wheel coupled to the shaft of the rotary switch and the colored area divided into sections, each section imprinted with a section color selected from the plurality of colors. As the color wheel is rotated by user manipulation of the edge, the colored area of the color wheel and the rotatable shaft of the rotary switch also rotate and the output of the rotary switch communicates current rotational position information corresponding to the color selected by the user to the controller. The position of the color wheel may be indicated by a selection mark in close physical proximity to the section of the colored area of the color wheel imprinted with the section color corresponding to the color selected by the user at the current position. In other embodiments, the position of the color wheel may be indicated by the color of section of the colored area that is visible through an aperture in an outer housing of the networked device and the color wheel is mounted so that a portion of the edge protrudes from the outer housing of the networked device allowing the user is able to manipulate the edge to rotate the color wheel about the axis. In some embodiments the color wheel may also include visible tactilely recognizable symbols.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

The term "network" refers to a bidirectional communication medium and protocol to allow a plurality of devices to communicate with each other.

The term "networked device" refers to any device that can communicate over a network.

Reference now is made in detail to the examples illustrated in the accompanying drawings and discussed below.

Figure 1:
FIG. 1 shows a table of color definitions used in this disclosure.

FIG. 1 is a table 100 indicating some embodiments of the colors that could be used with the subject of the present disclosure. The first column 101 contains reference numbers 0-9 to be used to referring to each color. Some embodiments may use fewer than 10 colors while others may use more than 10 colors. The second column 102 contains symbols that may optionally be imprinted on top of the color to help people who may have difficulty distinguishing between different colors. In this embodiment, the first color has no symbol, the next 8 colors use an Arabic numeral as the symbol, and the final symbol is a padlock. Other symbols may be used in other embodiments. The third column 103 contains the color names for the colors of this embodiment. Other colors could be used in other embodiments. The next four columns 104, entitled "Print Colors", give one possible set of colors to be mixed for 4-color printing processes. The four columns 104 represent the percentage of the maximum amount of ink for the cyan (C %), magenta (M %), yellow (Y %), and black (K %) and can range from 0% to 100%. Other mixes might be used for some embodiments depending on the specific inks, print stock and exact desired color. The next three columns 105, entitled "Computer Colors", give a possible representation for the indicated colors for use on a computer screen. The three columns 105 represent a color value for each of red (R), green (G) and blue (B) and range from 0 to 255 to allow the value for each component color to be stored in a single 8 bit storage location as is common in computer systems. The final (rightmost) column 106, entitled "Fill", gives a cross-hatch pattern to be used in the following black and white figures to indicate the color that would fill a particular area.

Figure 2:
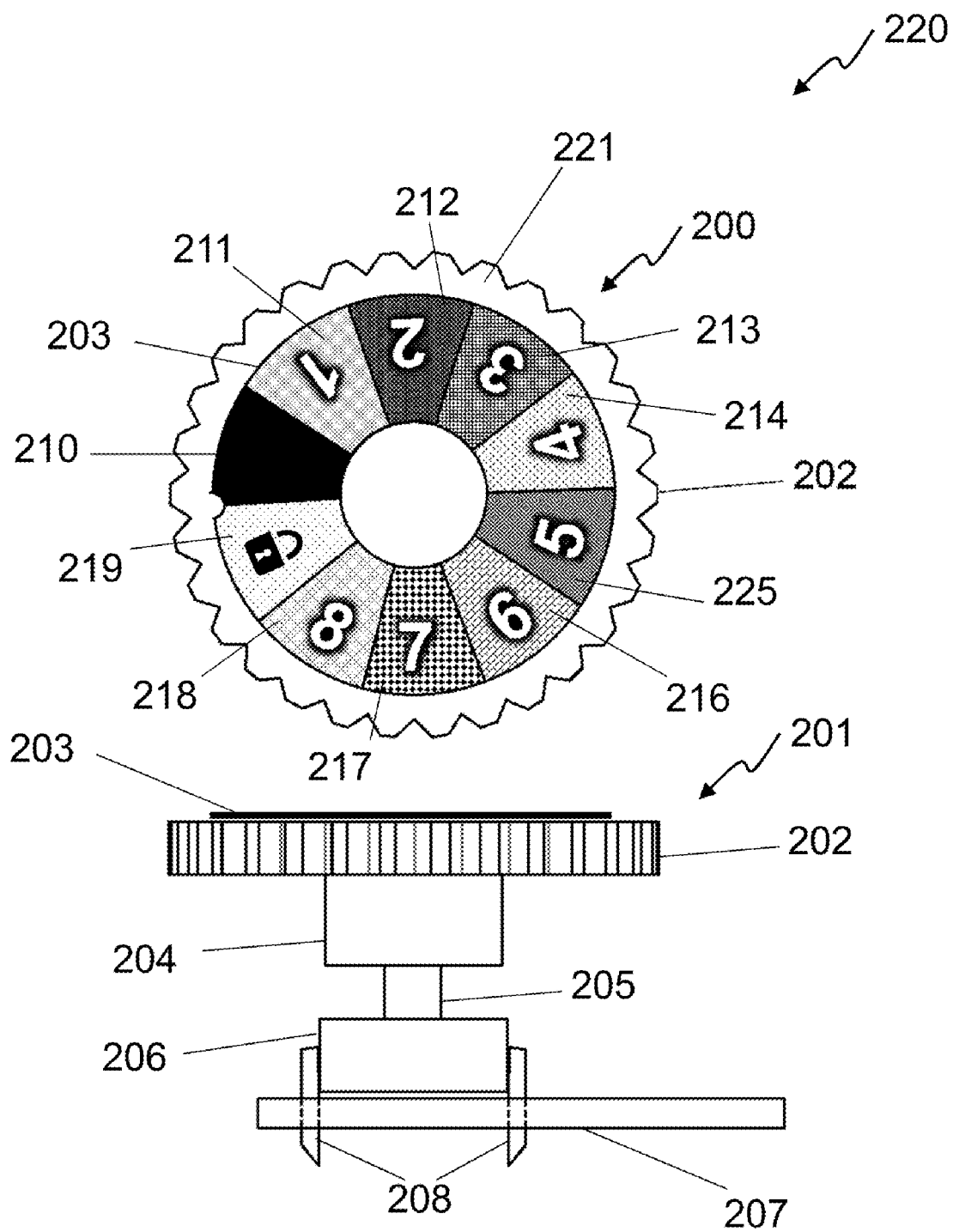
FIG. 2 shows an embodiment of a of color selection mechanism.

FIG. 2 shows one particular embodiment of a color selection mechanism 220 to allow a user to select a color. Top view 200 shows the color wheel 221 from the top and side view 201 shows the color wheel 221 from the side with some associated structure that has been omitted from the top view 200 for clarity. The color selection mechanism 220 has color wheel 221 with an edge 202 and a hub 204. The edge 202 may be knurled or textured to give better grip as it is rotated by the user. A colored area 203 is included on the color wheel 221. In this embodiment, the colored area 203 is implemented as a label attached to the top of the color wheel 221 with adhesive so that the center of the colored area 203 is coincident with the center of the color wheel 221. The colored area 203 is divided into sections 210-219, each section imprinted with a different color as defined in FIG. 1. In this embodiment, section 210 is imprinted with color 0 and no identifying symbol. In this embodiment, color 0 is black. Section 211 is imprinted with color 1 and the symbol "1". Section 212 is imprinted with color 2 and the symbol "2". Section 213 is imprinted with color 3 and the symbol "3". Section 214 is imprinted with color 4 and the symbol "4". Section 215 is imprinted with color 5 and the symbol "5". Section 216 is imprinted with color 6 and the symbol "6". Section 217 is imprinted with color 7 and the symbol "7". Section 218 is imprinted with color 8 and the symbol "8". Section 219 is imprinted with color 9 and the symbol of a padlock. In this embodiment color 9 is white. The colors imprinted on the colored area 203 represent nine non-locking colors 0-8 and one locking color 9 which is white. Other embodiments may use more or less than ten colors. The color wheel hub 204 is attached to the shaft 205 of a rotary dip switch 206 that may be mounted on a printed circuit board 207. As the color wheel 221 is turned, it turns the shaft 205 of the rotary dip switch 206 which generates a color code depending on the rotational angle of the shaft 205. The color code is then available on the pins 208 (not all pins are shown) of the rotary dip switch 206. The pins 208 may be connected to pull-up resistors and a controller located on the same printed circuit board (or elsewhere in the networked device). In one embodiment the rotary dip switch is a BCD encoder that generates 4 bits of output that can either be connected to ground or left as an open circuit so that as each output is connected to a pull-up resistor, the output represents a binary number between 0000 and 1010. Other methods of encoding the angular position of the color wheel 221 could also be used such as individual switch outputs for each rotary position, an analog to digital converter measuring a voltage across a potentiometer, an optical shaft encoder, a magnetic detector, two-axis hall-effect sensors or other well-known methods of detecting the angular position of a disk or shaft.

Figure 3:
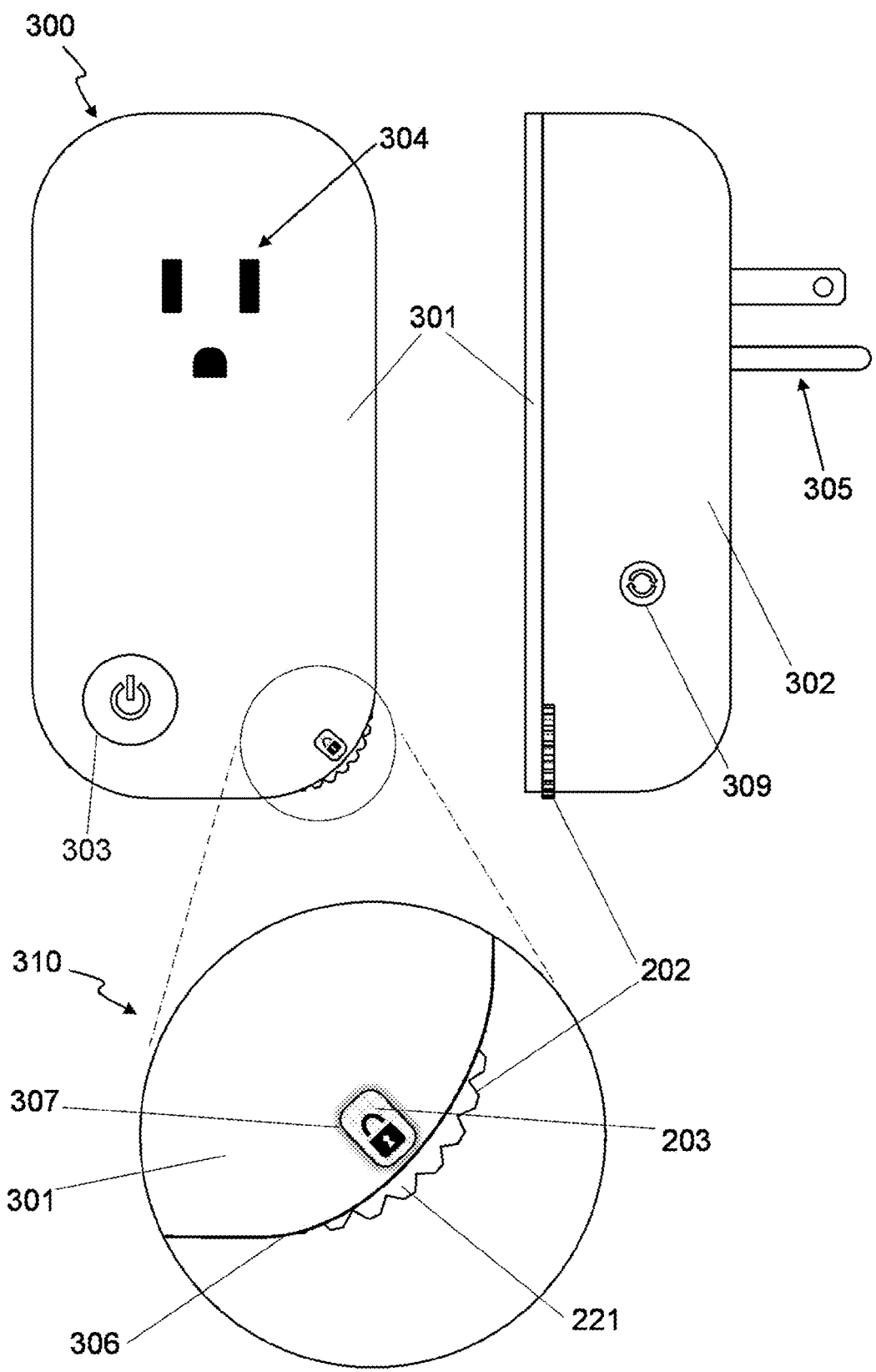
FIG. 3 shows a networked single outlet AC power socket.

FIG. 3 shows the color selection mechanism 220 implemented in a networked device 300. In this embodiment the networked device 300 is a controllable single outlet AC power socket but other embodiments may implement the disclosed subject matter in other appliances including, but not limited to, a multi-outlet power strip, a kitchen appliance such as a coffee maker, a garage door opener, an audio-video component, a computer peripheral, a lighting fixture, an electric heater, a fan, or any type of electrical device, either AC or battery powered. The networked device 300 of this embodiment has a front bezel 301, a rear case 302, a power switch 303, a sync button 309, a socket 304 and a plug 305. Circuitry is inside the networked device 300 including a controller, a network adapter, and a thyristor (not shown) that is able to control whether or not AC power from the plug 305 is allowed to pass to the socket 304. The color selection mechanism 220 is located at the bottom right of the networked device 300 and is shown in greater detail in the enhanced view 310. The edge 202 of the color wheel 221 protrudes beyond the outer rim 306 of the bezel 301 and case 302 of the networked device 300. This allows the user to apply a rotational force to the color wheel 221. As the color wheel 221 rotates, different sections of the colored area 203 of the color wheel 221 are visible through an aperture 307 in the bezel 301. In FIG. 3, the current position of the color wheel 221 is such that white (locked) section of the colored area 203 is visible. The color selection mechanism 220 may be designed to provide a detent at each section of the colored area 203 to make it clear what color is currently selected.

Figure 4:
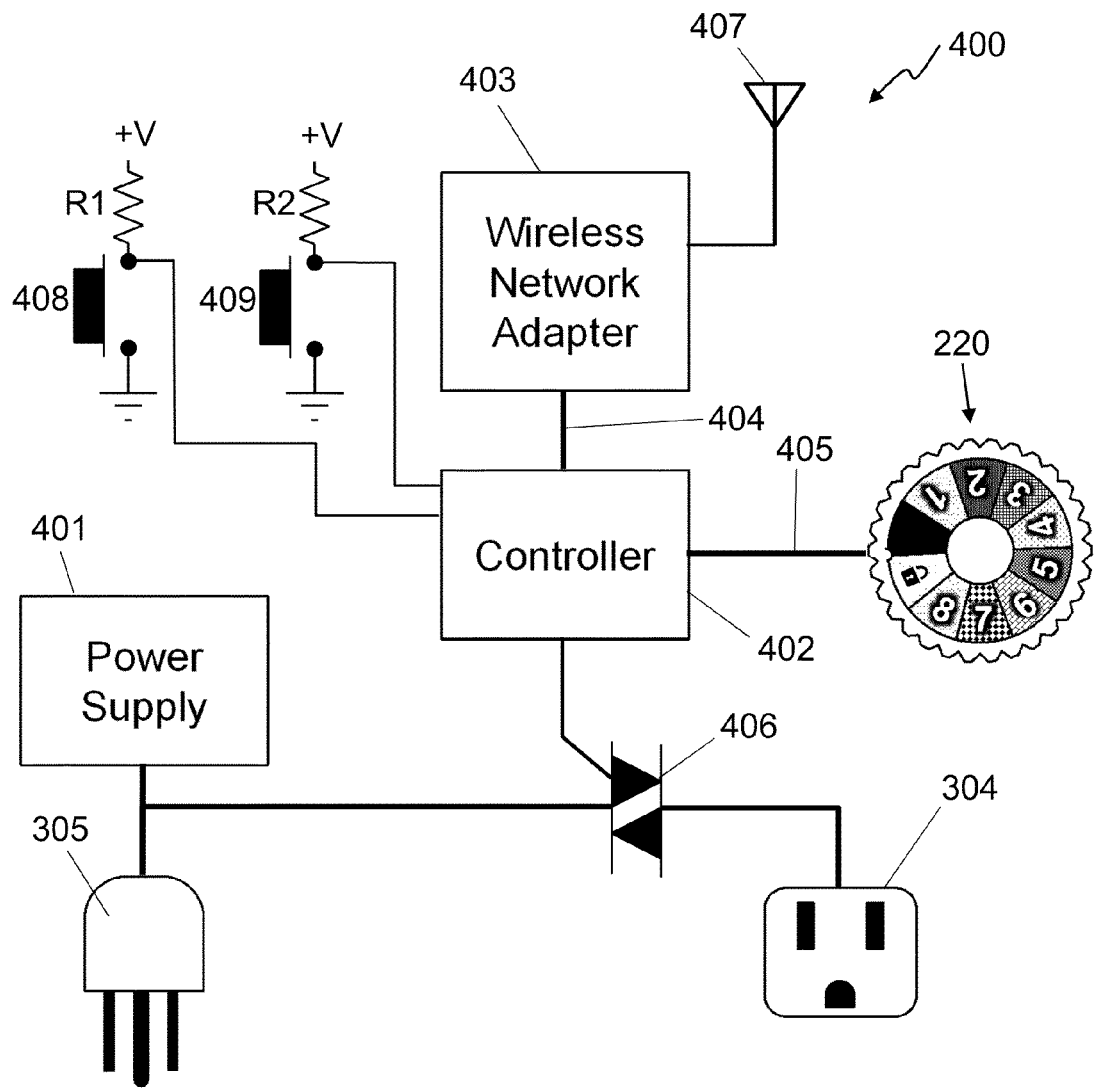
FIG. 4 shows a block diagram of the electronics for one embodiment.

FIG. 4 shows a block diagram of the control electronics 400 used in the networked device 300. The plug 305 provides AC power to the power supply 401 which generates the necessary power for the rest of the electronics. A wireless network adapter 403 receives radio frequency signals through antenna 407 and is connected to controller 402 by a digital bus 404. In some embodiments, the wireless network adapter may connect to a Z-wave, Zigbee (802.15) or Wi-Fi (802.11) wireless network. Other embodiments may use a wired or power line network adapter instead of a wireless network adapter. In some embodiments, the controller 402 is implemented as a microcontroller and in some embodiments, the controller, wireless network adapter, and digital bus may be integrated onto a single chip such as the Zensys ZM3102. A user interface is provided through several locally manipulatable controls. In this embodiment, a power button 408 is connected to a voltage source through a resistor 402 and a sync button 409 is connected to a voltage source through a resistor R2. Both buttons 408 and 409 are connected to the controller 402. A color selection device 220 is also connected to the controller 402 providing rotational position information through connection 405. The controller 402 converts the rotational position information to the color code corresponding to the color selected by the user. In other embodiments the user interface may be provided using other means such as a graphical user interface on a display or a keypad or any other device or combination of devices that allows the user to provide input to the controller 402. The controller 402 can control a thyrister 406 to determine whether or not the socket 304 is powered. Other embodiments may use a relay or other controllable power switch.

Figure 5:
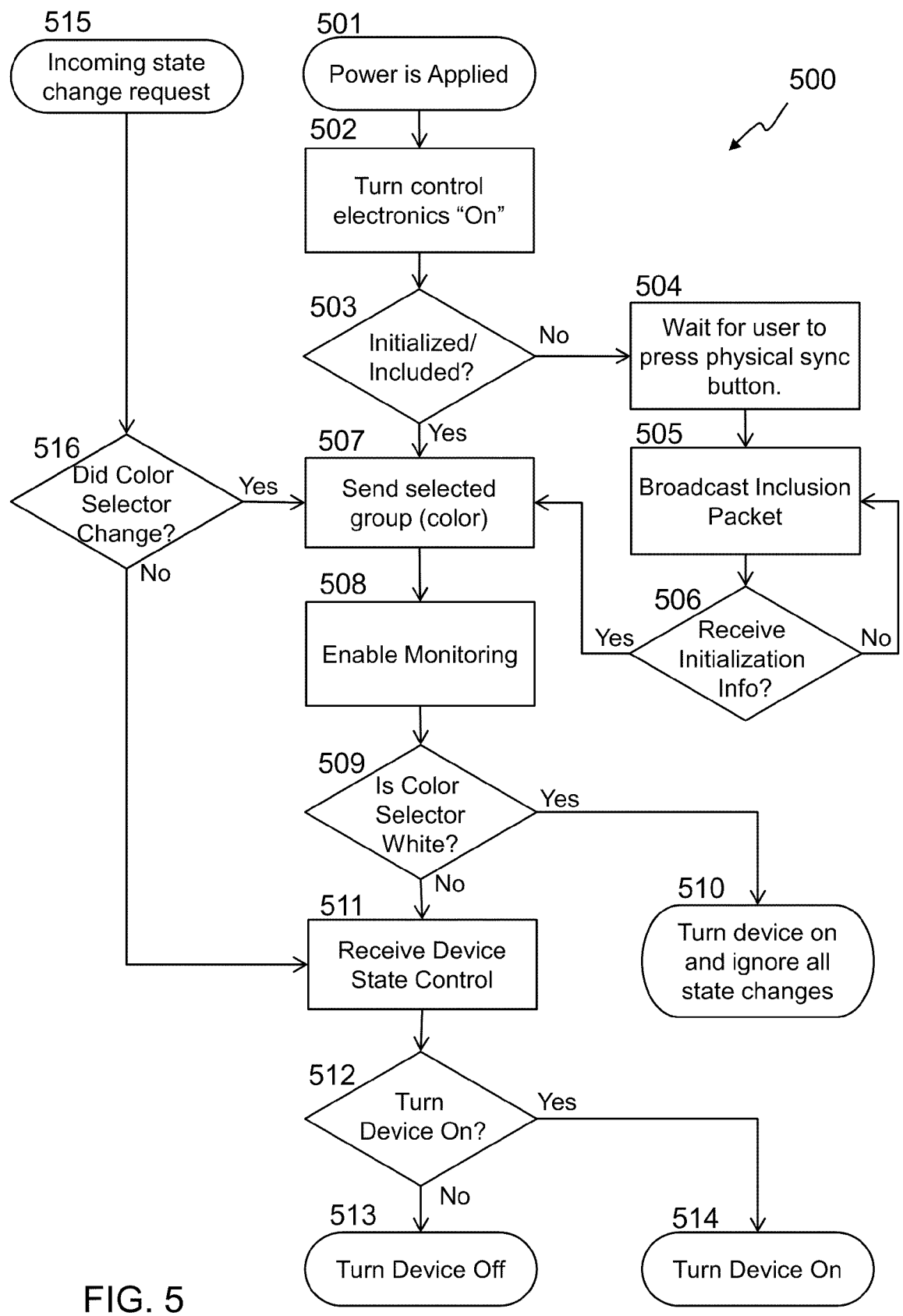
FIG. 5 is a flowchart describing how the color selection means is used in the configuration of a networked home automation device.

FIG. 5 shows a flow chart 500 for the operation of the networked device 300 of the current subject matter. The exact order of operations and details shown in this flow chart 500 may differ between embodiments but one skilled in the art can see how the concepts presented herein would still apply. After power is applied 501, the networked device 300 turns 400 the control electronics on. The controller 402 then checks 503 to see if the device has been previously initialized and included into the network. If the device has not yet been initialized and included into the network, it waits 504 until the user presses the sync button 409. Once the sync button 409 has been pressed, the controller 402 broadcasts 505 an inclusion packet over the network to let a network controller know that there is a new device on the network that needs to be initialized and configured. The controller 402 then waits 506 for some period of time to receive initialization information from the network controller. If no initialization information is received, the controller rebroadcasts 505 an inclusion packet and waits again, repeating this process until initialization information is received 506. Once initialization information has been received, the controller 402 generates the color code from information received from the color selection mechanism 220 and sends 507 the color code out to the network controller. The network controller uses the color code to help further configure the device and create a more user-friendly user interface for the entire network. One way the network controller may use the color code is to allow the user to assign a particular color to a room and set all the networked devices located in that room to the same color. An alternative use is to differentiate all similar devices using a different color so that the user can easily tell which device is which as they interact with the network controller. In yet another use, the color can be used to group devices together that interact such as all the audio-visual devices. In some embodiments, a specific color, such as black, may be interpreted by the network controller as meaning that the device is not assigned to a particular group and the controller can ask the user which group the device should be assigned to. In other embodiments that require more than 8 distinct color assignments, the network controller may allow the user to select from a plurality of additional colors, beyond the colors directly available from the color selection mechanism of the device, so that the user can have a larger choice of colors available for device assignment.

After the color code has been transmitted 507, the controller 402 may enable monitoring 508 of the status of the device. A networked device may allow the network controller or other network devices to query its current state, current power usage, current condition of its consumables used by the networked device, diagnostic information or other information available to the networked device that other devices on the network might find useful. The controller 402 then determines 509 if the color selected is the locking color, in this case white. If the locking color has been selected, the controller then turns (or leaves) the device in an operating "on" state but ignores 510 all control requests that may come in over the network. In some embodiments, the controller may also ignore all local control requests such as the user pressing the power button 408 if the locking color has been selected.

If the color selected 509 on the color selection mechanism 420 is not white, the controller 402 then is enabled to receive 511 control packets over the network. If the control packet tells the controller 402 to turn the device On 512, the controller 402 controls the thyristor 406 to allow the socket 304 to be energized 514. If the control packet tells the controller 402 to turn the device Off 512, the controller 402 controls the thyristor 406 to isolate the socket 304 from electrical power, turning it off 513. Depending on the capability of the networked device, many states other than the On/Off state may be controlled. On occasion new incoming state change requests may be received 515. Those state change requests may come over the network or they may be received from a local user interface on the device. Whenever a new state change request is received 515, the controller 402 checks to see if the color selected by the user on the color selection device 220 has changed 516. In some embodiments, the act of changing the color may generate a state change request. If the color has changed 516, the controller 402 sends the new color out over the network to let the network controller know that the user has changed the color code on the device. The controller then proceeds through the same set of steps 508-514 as described in the initial power-up sequence. If the color has not changed 516, there is no need to rebroadcast the color code or recheck to see if the color is white, so the controller simply receives 511 the control packet and takes appropriate action 512-514.

Figure 6:
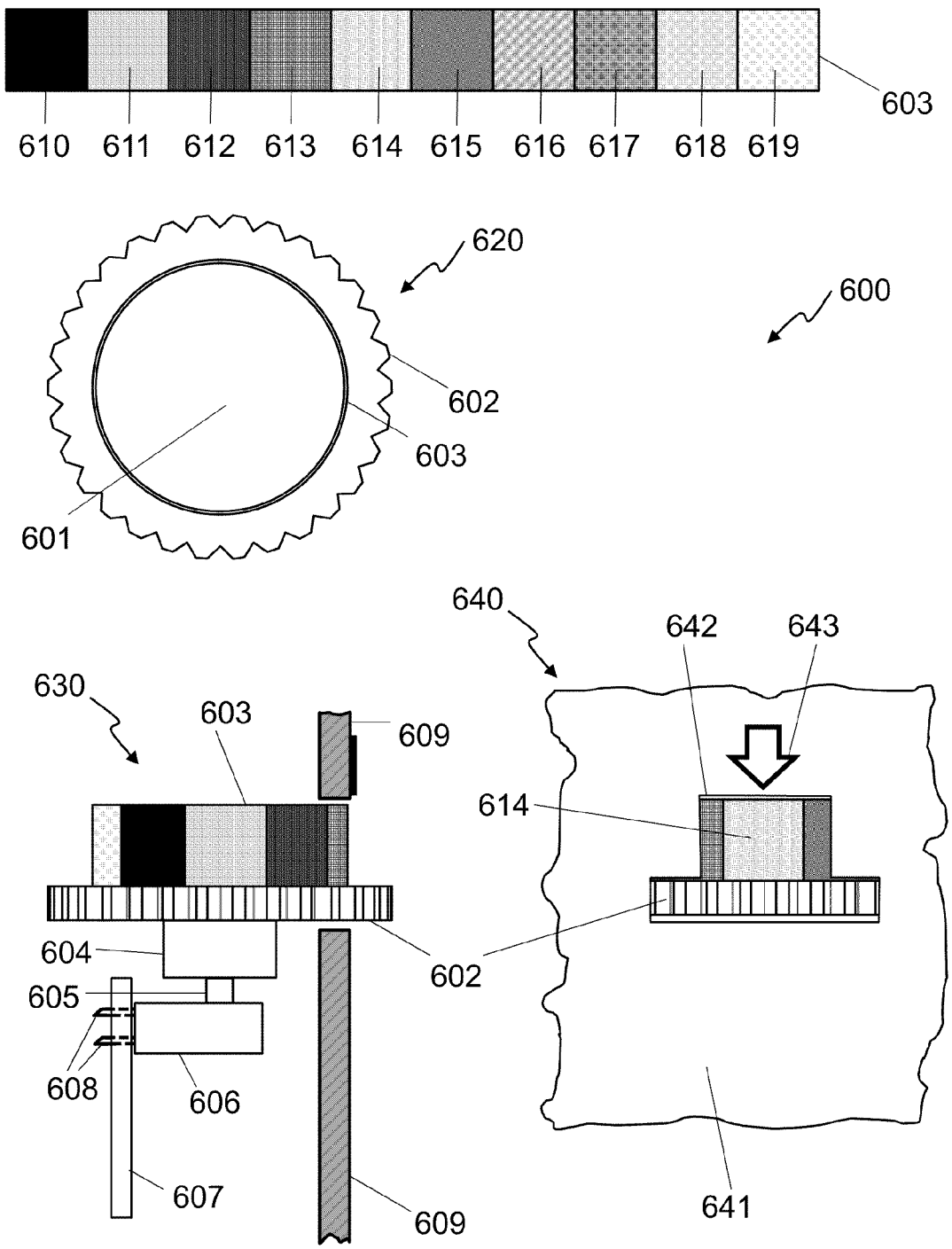
FIG. 6 shows an alternative embodiment of a of color selection mechanism.

FIG. 6 shows an alternative embodiment of a color selection mechanism 600 to allow a user to select a color. Top view 620 shows the color wheel from the top and side view 630 shows the color wheel from the side with some associated structure that has been omitted from the top view 620 for clarity. The color wheel mechanism 600 has a color wheel with a raised disc 601, an edge 602 extending out beyond the raised disc, and a hub 604. The edge 602 may be knurled or textured to give better grip as it is rotated by the user. A colored area 603 is included on the color wheel. In this embodiment, the colored area 603 is implemented as a label that is wrapped around the raised disc 601 and attached with adhesive. The colored area 603 is divided into sections 610-619, each section imprinted with a different color as defined in FIG. 1. In this embodiment, section 610 is imprinted with color 0, section 611 is imprinted with color 1, section 612 is imprinted with color 2, section 613 is imprinted with color 3, section 614 is imprinted with color 4, section 615 is imprinted with color 5, section 616 is imprinted with color 6, section 617 is imprinted with color 7, section 618 is imprinted with color 8, and section 619 is imprinted with color 9. In this embodiment, no symbols are included with the colors although other similar embodiments may include visible or tactilely recognizable symbols on one or more of the sections 610-619. The colors imprinted on the colored area 603 represent nine non-locking colors 0-8 and one locking color 9 which is white. The color wheel hub 604 is attached to the shaft 605 of a rotary dip switch 606 that may be mounted on a printed circuit board 607. As the color wheel is turned, it turns the shaft 605 of the rotary dip switch 606 which generates a set of open or closed switches depending on the rotational angle of the shaft 605. The color code is then available on the pins 608 (not all pins are shown) of the rotary dip switch 606. The pins 608 may be connected to pull-up resistors and a controller located on the same printed circuit board (or elsewhere in the networked device). In one embodiment the rotary dip switch is a BCD encoder that generates 4 bits of output that can either be connected to ground or left as an open circuit so that as each output is connected to a pull-up resistor, the output represents a binary number between 0000 and 1010. Other methods of encoding the angular position of the color wheel could also be used such as such as individual switch outputs for each rotary position, an analog to digital converter measuring a voltage across a potentiometer, an optical shaft encoder, a magnetic detector, two-axis hall-effect sensors or other well-known methods of detecting the angular position of a disk or shaft.

A cross section of a wall 609 of the networked device shows the edge 602 protruding through the wall and a portion of the colored area 603 visible through an opening in the wall 609. Exterior view 640 shows the outside of the networked device with the wall 641 having an opening 642. In this embodiment, the opening 642 has a wider section at the bottom to allow the edge 602 to protrude from the wall 641 while keeping the upper portion of the opening 642 narrower so that can be mostly filled with one section of the color wheel. In the position shown, section 614 is filling most of opening 642. To help make it even clearer which color is selected, an indicator arrow 643 is included on the wall 641 pointing at the current color. The color selection mechanism 600 may be designed to provide a detent at each section 610-619 of the colored area 603 to make it easy for the user to center the desired section. in the opening 642.

Figure 7:
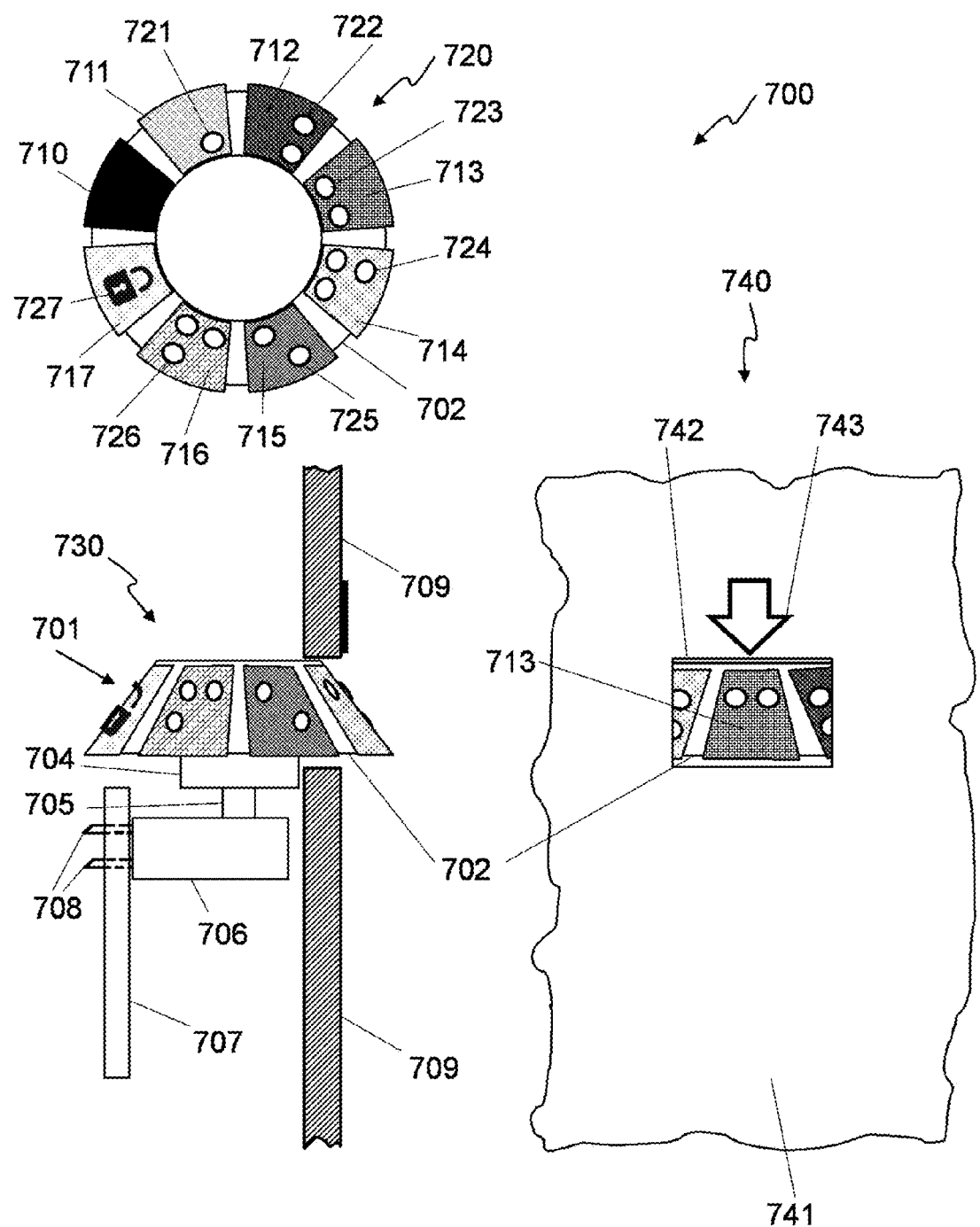
FIG. 7 shows a different alternative embodiment of a of color selection mechanism.

FIG. 7 shows another alternative embodiment of a color selection mechanism 700 to allow a user to select a color. Top view 720 shows the color wheel from the top and side view 730 shows the color wheel from the side with some associated structure that has been omitted from the top view 720 for clarity. The color wheel mechanism 700 has a color wheel with an angled side 701, an edge 702 at the outermost part of the angled side 701, and a hub 704. The angle of the angled side 701 may range from 0 (parallel with the axis) to nearly 90 degrees (nearly flat as shown in FIG. 2). The edge 702 may be knurled or textured to give better grip as it is rotated by the user. A plurality of colored sections 710-717 are included on the angled side 701. The colored sections 710-717 may be immediately adjacent to each other or may have some space with a neutral color between them as is shown in this embodiment. This embodiment has eight sections, each section a different color as defined in FIG. 1. In this embodiment, section 710 is color 0, section 711 is color 1, section 712 is color 2, section 713 is color 3, section 714 is color 4, section 715 is color 5, section 716 is color 6, and section 717 is color 9. In this embodiment, visible and tactilely recognizable symbols are also included on some of the sections. Section 711 has the braille symbol for one 721, section 712 has the braille symbol for two 722, section 713 has the braille symbol for three 723, section 714 has the braille symbol for four 724, section 715 has the braille symbol for five 725, section 716 has the braille symbol for six 726, and section 717 has a raised padlock symbol 727. Other embodiments may use other tactilely recognizable symbols. Yet other embodiments may not include tactilely recognizable symbols. In other embodiments the tactilely recognizable symbols may not be readily visible and other visible symbols may or may not be included. The colors on the angled edge 701 represent seven non-locking colors 0-6 and one locking color 9 which is white. The color wheel hub 704 is attached to the shaft 705 of a rotary dip switch 706 that may be mounted on a printed circuit board 707. As the color wheel is turned, it turns the shaft 705 of the rotary dip switch 706 which generates information depending on the rotational angle of the shaft 705. The information is then available on the pins 708 (not all pins are shown) of the rotary dip switch 706. The pins 708 may be connected to pull-up resistors and a controller located on the same printed circuit board (or elsewhere in the networked device). In one embodiment the rotary dip switch is an octal encoder that generates 3 bits of output that can either be connected to ground or left as an open circuit so that as each output is connected to a pull-up resistor, the output represents a binary number between 000 and 111. Other methods of encoding the angular position of the color wheel could also be used such as such as individual switch outputs for each rotary position, an analog to digital converter measuring a voltage across a potentiometer, an optical shaft encoder, a magnetic detector, two-axis hall-effect sensors or other well-known methods of detecting the angular position of a disk or shaft.

A cross section of a wall 709 of the networked device shows the edge 702 protruding through the wall and a portion of the angled side 701 visible through an opening in the wall 709. Exterior view 740 shows the outside of the networked device with the wall 741 having an opening 742. In the position shown, section 713 is filling most of opening 742. To help make it even clearer which color is selected, and indicator arrow 743 is included on the wall 741 pointing at the current color. The color selection mechanism 700 may be designed to provide a detent at each section 710-717 to make it easy for the user to center the desired section in the opening 742.

Figure 8A:
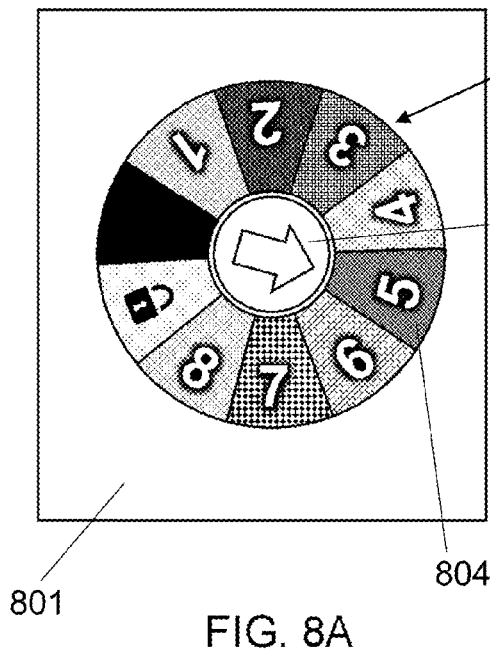
FIGS. 8A, 8B, 8C and 8D show additional embodiments of color selection mechanism.

FIGS. 8A, 8B, 8C and 8D show additional alternative embodiments of a color selection mechanism. FIG. 8A shows a networked device 801 with a non-moveable color wheel 802 imprinted or affixed to the networked device 801. A rotatable selector 803 can be turned by the user to select a color. The section 804 of the non-moveable color wheel 802 with the color "5" is selected at the current position of the rotatable selector 803. Means to convert the angular position of the rotatable selector 803 to a color code would also be included.

Figure 8B:
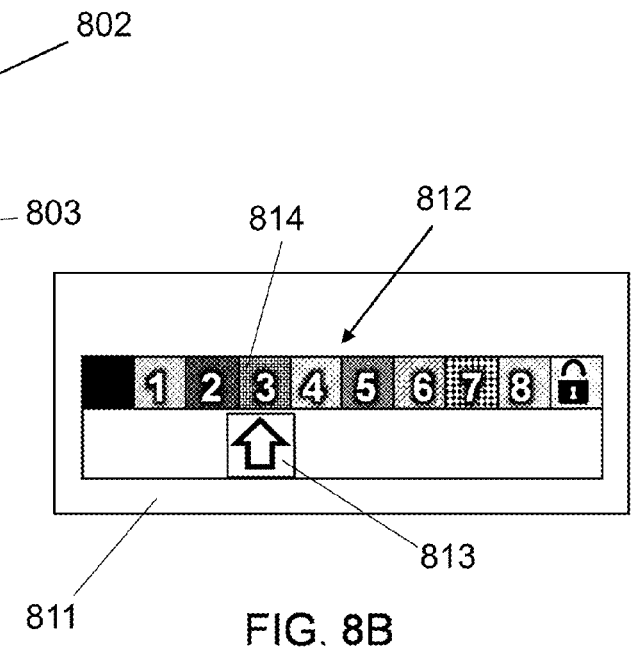

FIG. 8B shows a linear color selector. Networked device 811 has a color label 812 affixed. Sliding selector 813 can be moved back and forth by the user to select a color. A linear slide switch moved by the sliding selector 813 can be used to generate a color code.

Figure 8C:
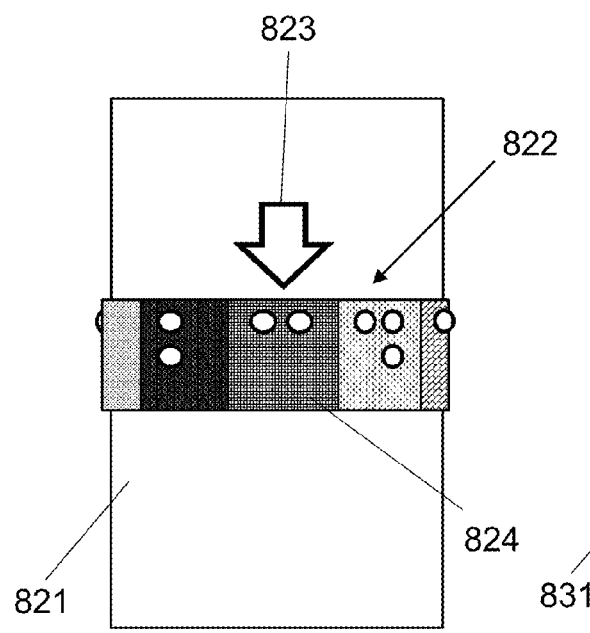
Figure 8D:
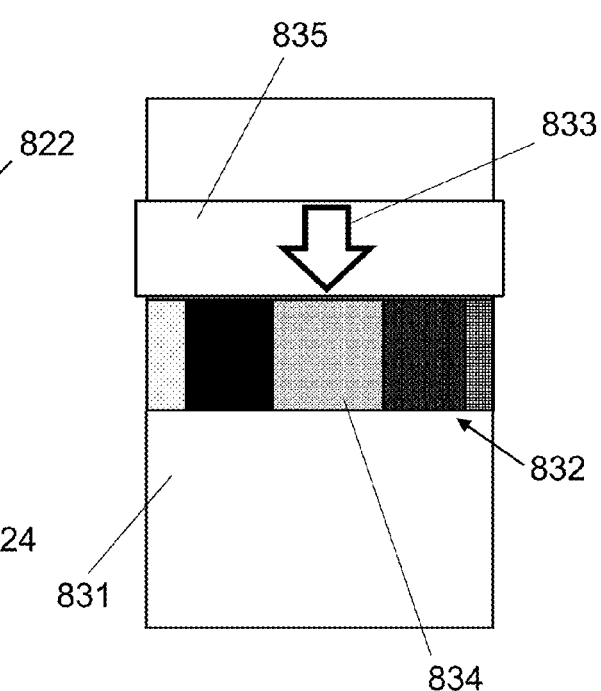

FIG. 8C shows a networked device with a cylindrical element 821. Rotating color sleeve 822 can be rotated about the cylindrical element 821. Selection indicator 823 points at the currently selected color on the rotating color sleeve 822. The currently selected color in FIG. 8C is color "3", the color of section 824. FIG. 8D also shows a networked device with a cylindrical element 831. Rotating selector sleeve 835 with a selector indicator 833 can be rotated about the cylindrical element 831. Fixed color ring 832 is affixed to the cylindrical element 831 adjacent to the rotating selector sleeve 835. Selection indicator 833 points at the currently selected color on the fixed color sleeve 832. In FIG. 8D the currently selected color is color "1", the color of section 834.

One embodiment may use multicolored LEDs, a set or red, green and blue LEDs, or other colored lights to indicate the color chosen to the user. The user may push a button to cycle between the different colors or a capacitive sensing switch or other proximity or touch device could be used to select a color. In other embodiment, voice recognition might be used to detect the color being spoken, or a video camera could be used and a color sample put into the view of the video camera. Any method for the user to enter a color selection could be used in some embodiments.

Figure 9:
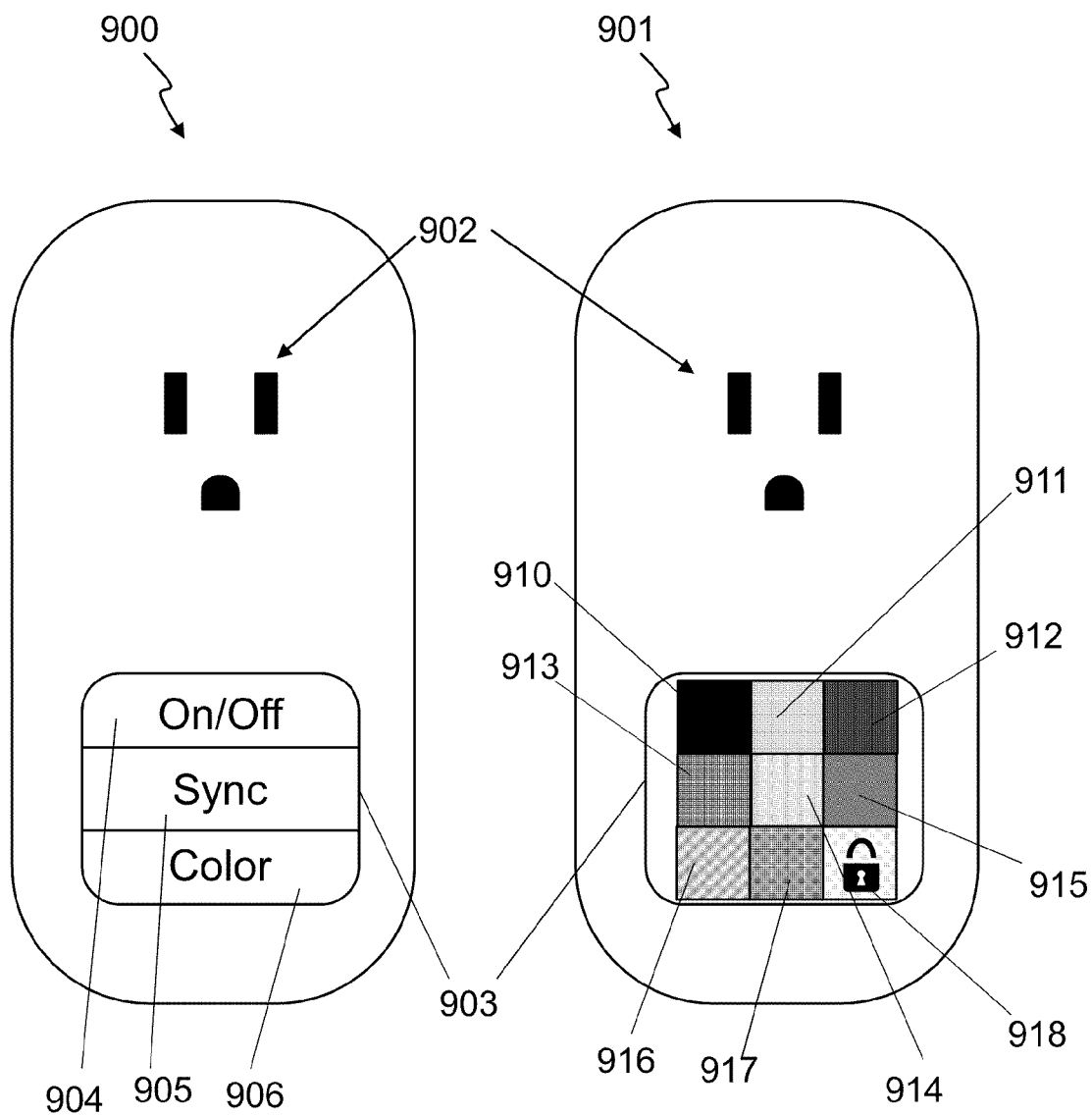
FIG. 9 shows an embodiment using a touch sensitive graphical user interface.

FIG. 9 shows a networked device 900, 901 with a touch sensitive display 903 used for a graphic user interface (GUI). The networked device 900 on the left shows the look of the GUI at one point in time where it allows the user to turn the power on/off if a first section 904 of the screen is touched. If a second section 905 of the screen is touched, the networked device 900 tries to connect to the network. And if a third section 906 of the screen is touched, a second level of menu is shown on the touch sensitive display 903. The view of the networked device 901 on the right shows the second level of menu that is used to select the color. Nine different sections 910-918 of the touch sensitive display 903 are created, each with a different color. Some may have visible symbols as well. If the user touches one of the sections 910-918, the color of that section is taken as the user selected color. A controller can then convert the information about which section was touched to the appropriate color code.

Unless otherwise indicated, all numbers expressing quantities of elements, optical characteristic properties, and so forth used in the specification and claims are to be understood as being modified in all instances by the term "about." Accordingly, unless indicated to the contrary, the numerical parameters set forth in the preceding specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to an element described as "an LED" may refer to a single LED, two LEDs or any other number of LEDs. As used in this specification and the appended claims, the term "or" is generally employed in its sense including "and/or" unless the content clearly dictates otherwise.

As used herein, the term "coupled" includes direct and indirect connections. Moreover, where first and second devices are coupled, intervening devices including active devices may be located there between.

Any element in a claim that does not explicitly state "means for" performing a specified function, or "step for" performing a specified function, is not to be interpreted as a "means" or "step" clause as specified in 35 U.S.C. §112, ¶ 6. In particular the use of "step of" in the claims is not intended to invoke the provision of 35 U.S.C. §112, ¶ 6.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. A networked device comprising:
   means for controlling a state of the networked device;
   means for connecting to a network;
   means for allowing a user to select a color from a plurality of colors, the plurality of colors having at least one locking color and one or more non-locking colors; and
   means for generating a selected color code corresponding to the color selected by the user, each color of the plurality of colors having a corresponding color code; wherein
   the means for connecting to the network sends the selected color code over the network; and
   the means for controlling the state of the networked device changes the state of the networked device in response to a message from the network only if the color selected by the user is one of the one or more non-locking colors.

2. The networked device of claim 1 in which the means for controlling the state of the networked device controls an On/Off state of the networked device.

3. The networked device of claim 1 in which the networked device responds to a request for status information from the network independent of the color selected by the user.

4. The networked device of claim 1 further comprising:
   means for allowing the user enter a local control command; wherein
   the means for controlling the state of the networked device changes the state of the networked device in response to the local control command only if the color selected by the user is one of the one or more non-locking colors.

5. The networked device of claim 4 in which the means for controlling the state of the networked device controls an On/Off state of the networked device.

6. A networked device comprising:
   a controller;
   a network adapter communicatively coupled to the controller; and
   a color selection mechanism communicatively coupled to the controller, the color selection mechanism allowing a user to select a color from a plurality of colors, the plurality of colors having at least one locking color and one or more non-locking colors; wherein
   the color selection mechanism communicates information corresponding to the color selected by the user to the controller;
   the controller converts the information communicated by the color selection mechanism to a color code corresponding to the color selected by the user,
   the controller communicates the color code to the network adapter,
   the network adapter sends the color code out over a network,
   the network adapter receives a message from the network to change a state of the networked device and communicates it to the controller, and
   the controller changes the state of the networked device in response to the message to change the state of the networked device communicated by the network adapter only if the color selected by the user is one of the one or more non-locking colors.

7. The networked device of claim 6 in which the network utilizes communication over an AC power line.

8. The networked device of claim 6 in which the network utilizes radio frequency communication.

9. The networked device of claim 6 in which the controller and the network adapter are integrated on a single integrated circuit.

10. The networked device of claim 6 in which the state of the networked device being controlled is an On/Off state of the networked device.

11. The networked device of claim 6 in which
    the network adapter receives a status request message over the network and communicates it to the controller; and
    the controller responds to the status request message by communicating a response message to the network adapter to send out over the network, the controller responding independent of the color selected by the user.

12. The networked device of claim 6 further comprising:
    a local control interface communicatively coupled to the controller, the local control interface allowing the user to enter a local control command to request a change to the state of the networked device; wherein
    the controller changes the state of the networked device in response to the local control command only if the color selected by the user is one of the one or more non-locking colors.

13. The networked device of claim 12 in which the state of the networked device to which the local control command requests a change is an On/Off state of the networked device.

14. The networked device of claim 6 in which the color selection mechanism is a graphical user interface.

15. The networked device of claim 6, the color selection mechanism comprising:
    an electrical component with a rotatable shaft and an output communicatively coupled to the controller; and a color wheel having a center, an edge and a colored area, the center of the color wheel coupled to the rotatable shaft of the electrical component and the colored area divided into sections, each section imprinted with a section color selected from the plurality of colors; such that as the color wheel is rotated by user manipulation of the edge, the colored area of the color wheel and the rotatable shaft of the electrical component also rotate; and the output of the electrical component with a rotatable shaft communicates current rotational position information corresponding to the color selected by the user to the controller.

16. The networked device of claim 15 wherein the electrical component with a rotatable shaft is a rotary switch.

17. The networked device of claim 15 wherein the electrical component with a rotatable shaft is a potentiometer and the controller further comprising an analog to digital converter, the input of the analog to digital converter electrically connected to a voltage divider circuit that changes as the shaft of the potentiometer rotates.

18. The networked device of claim 15, the color selection mechanism further comprising:
a selection mark in close physical proximity to the section of the colored area of the color wheel imprinted with the section color corresponding to the color selected by the user at the current rotational position.

19. The networked device of claim 15 further comprising an outer housing with an aperture; wherein
the color wheel is mounted in the networked device so that,
a portion of the edge of the color wheel protrudes from the outer housing of the networked device, whereby the user is able to manipulate the edge to rotate the color wheel about its center;
a portion of the colored area is visible through the aperture in the outer housing of the networked device; and
a majority of the portion of the colored area visible through the aperture in the outer housing of the networked device is the section of the colored area imprinted with the section color corresponding to the color code selected by the user at the current rotational position.

20. The networked device of claim 15 in which at least one section of the colored area is also imprinted with a visible symbol.

21. The networked device of claim 15 in which at least one section of the colored area has a tactilely recognizable symbol.

* * * * *